United States Patent [19]

Smith et al.

[11] Patent Number: 5,585,164
[45] Date of Patent: Dec. 17, 1996

[54] DUAL GROOVE SET RETROREFLECTIVE CUBE CORNER ARTICLE AND METHOD OF MANUFACTURE

[75] Inventors: Kenneth L. Smith, White Bear Lake; Gerald M. Benson, Woodbury, both of Minn.

[73] Assignee: Minnesota Mining and Manufacturing Company, St. Paul, Minn.

[21] Appl. No.: 139,447

[22] Filed: Oct. 20, 1993

[51] Int. Cl.$^6$ ..................................... B32B 3/00
[52] U.S. Cl. .................. 428/156; 428/161; 428/167; 428/172; 428/212; 428/221; 359/530; 359/534; 359/535
[58] Field of Search .................. 428/156, 161, 428/167, 172, 212, 913; 359/530, 534, 535, 537

[56] References Cited

U.S. PATENT DOCUMENTS

| | | | |
|---|---|---|---|
| 1,591,572 | 7/1926 | Stimson . | |
| 2,310,790 | 2/1943 | Jungersen | 88/105 |
| 2,407,680 | 9/1946 | Palmquist et al. | 88/82 |
| 3,190,178 | 6/1965 | McKenzie | 88/82 |
| 3,417,959 | 12/1968 | Schultz | 249/117 |
| 3,684,348 | 8/1972 | Rowland | 350/103 |
| 3,689,346 | 9/1972 | Rowland | 156/245 |
| 3,712,706 | 1/1973 | Stamm | 350/103 |
| 3,810,804 | 5/1974 | Rowland | 156/245 |
| 3,811,983 | 5/1974 | Rowland | 156/245 |
| 3,873,184 | 3/1975 | Heenan | 350/103 |
| 3,922,065 | 11/1975 | Schultz | 350/103 |
| 3,924,929 | 12/1975 | Holmen et al. | 350/103 |
| 3,926,402 | 12/1975 | Heenan | 249/117 |
| 4,025,159 | 5/1977 | McGrath | 350/105 |
| 4,202,600 | 5/1980 | Burke et al. | 350/103 |
| 4,208,090 | 6/1980 | Heenan | 350/61 |
| 4,243,618 | 1/1981 | Van Arnam | 264/1 |
| 4,349,598 | 9/1982 | White | 428/161 |
| 4,498,733 | 2/1985 | Flanagan | 350/102 |
| 4,576,850 | 3/1986 | Martens | 428/156 |
| 4,582,885 | 4/1986 | Barber | 528/28 |
| 4,588,258 | 5/1986 | Hoopman | 350/103 |
| 4,618,518 | 10/1986 | Pricone et al. | 428/40 |
| 4,668,558 | 5/1987 | Barber | 428/156 |
| 4,726,706 | 2/1988 | Attar | 404/14 |
| 4,801,193 | 1/1989 | Martin | 350/103 |
| 4,895,428 | 1/1990 | Nelson et al. | 350/103 |
| 4,938,563 | 7/1990 | Nelson et al. | 350/103 |
| 5,122,902 | 6/1992 | Benson | 359/529 |
| 5,171,624 | 12/1992 | Walter | 428/156 |

FOREIGN PATENT DOCUMENTS

| | | | |
|---|---|---|---|
| 9217179.6 | 4/1993 | Germany | G02B 5/124 |
| 423464 | 2/1935 | United Kingdom . | |
| 441319 | 1/1936 | United Kingdom . | |

*Primary Examiner*—Patrick J. Ryan
*Assistant Examiner*—William A. Kaynski
*Attorney, Agent, or Firm*—Gary L. Griswold; Walter N. Kirn; Robert H. Jordan

[57] ABSTRACT

A retroreflective cube corner article which is a replica of a directly machined substrate in which a plurality of geometric structures including cube corner elements are machined in the substrate using only two sets of parallel grooves. At least two of the grooves in at least one of the groove sets are at a different groove depth.

42 Claims, 12 Drawing Sheets

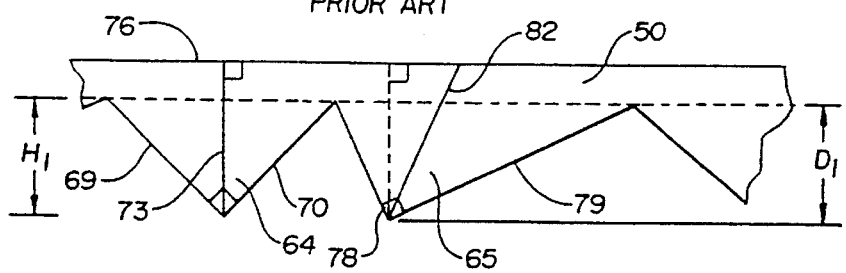
Fig.7 PRIOR ART
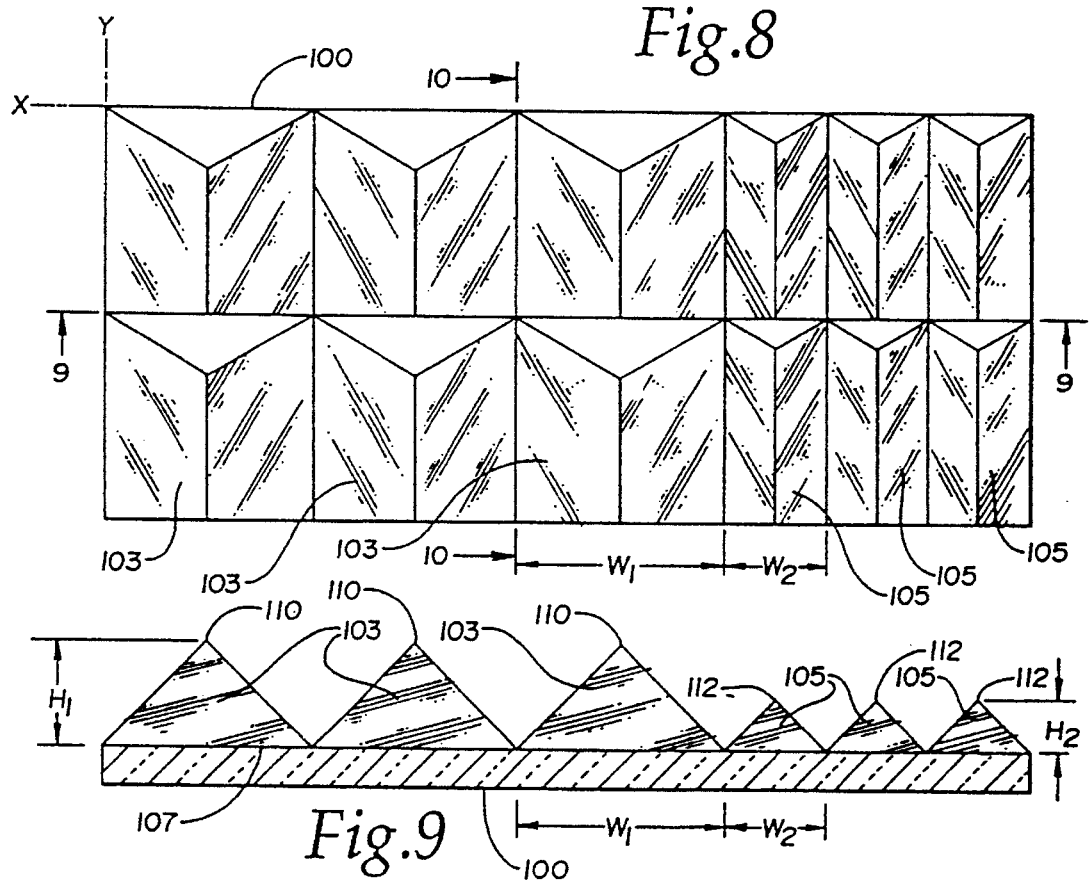
Fig.8
Fig.9
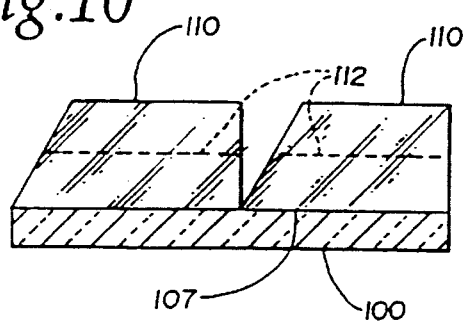
Fig.10
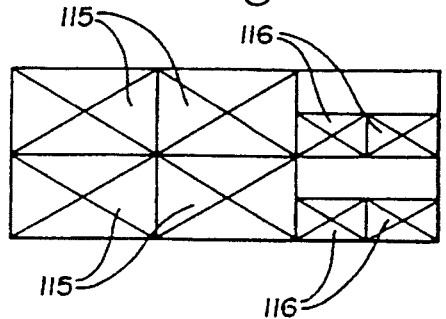
Fig.11

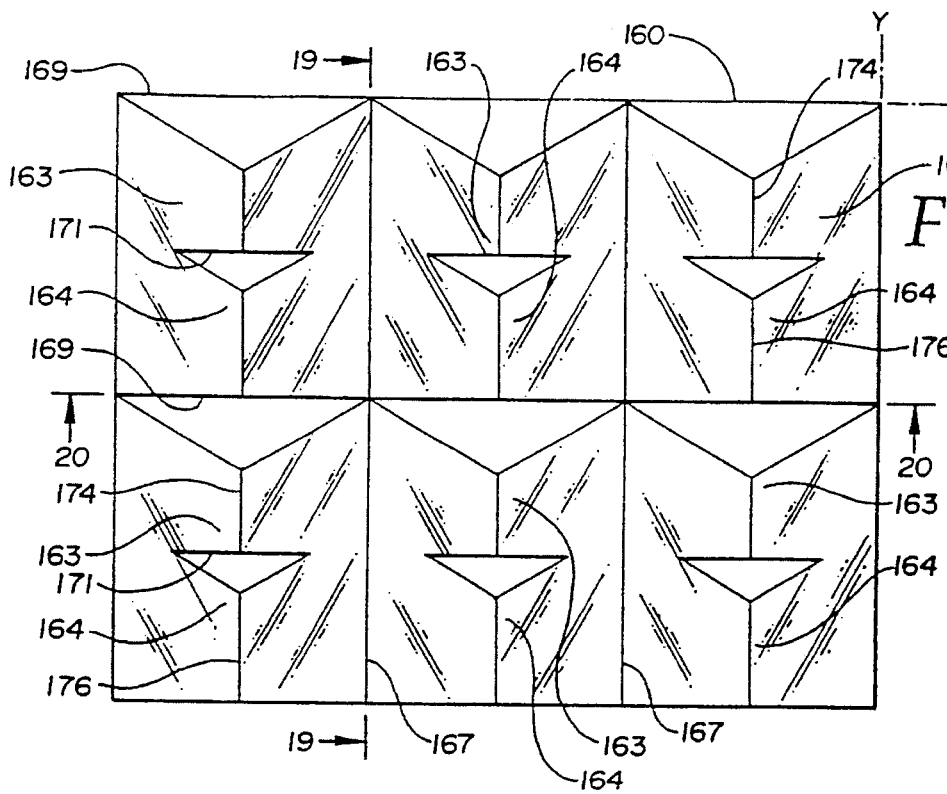
*Fig.18*
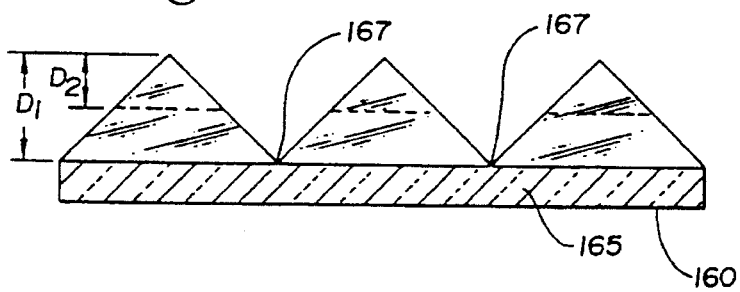
*Fig.20*
*Fig.19*
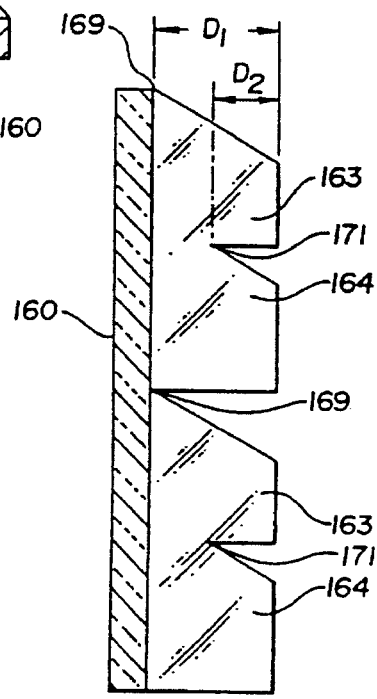
*Fig.21*
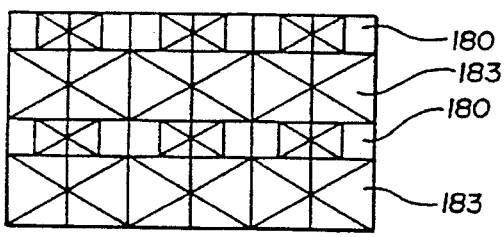

Fig.25
Fig.27
Fig.26
Fig.28
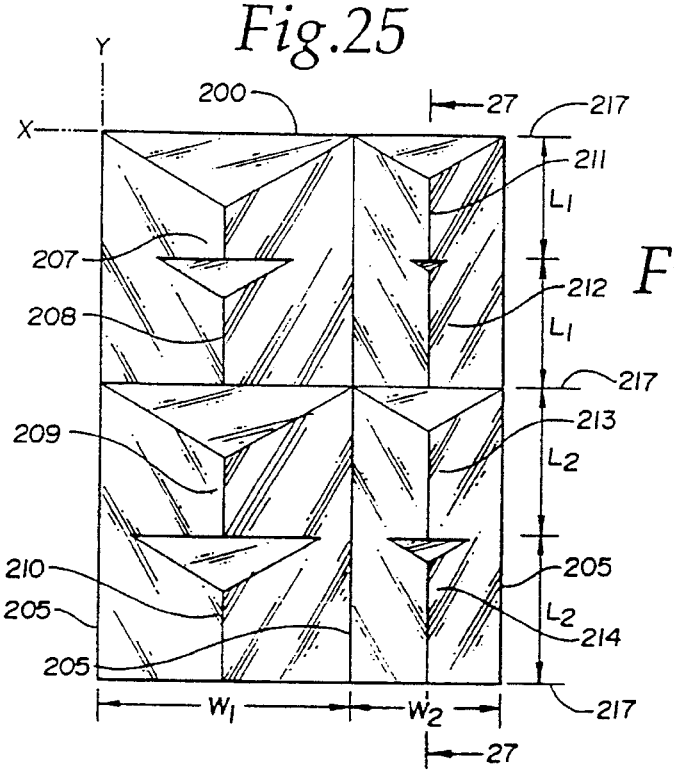
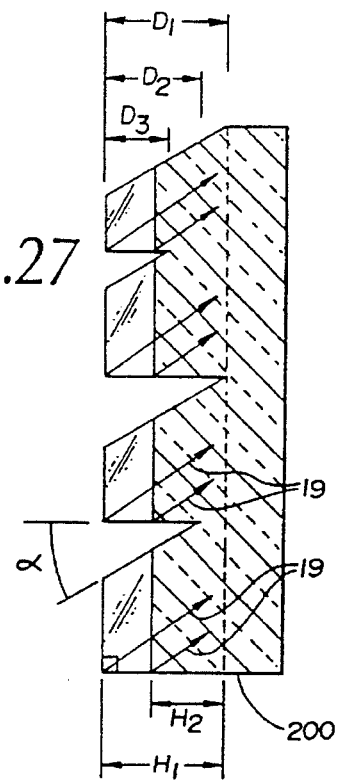
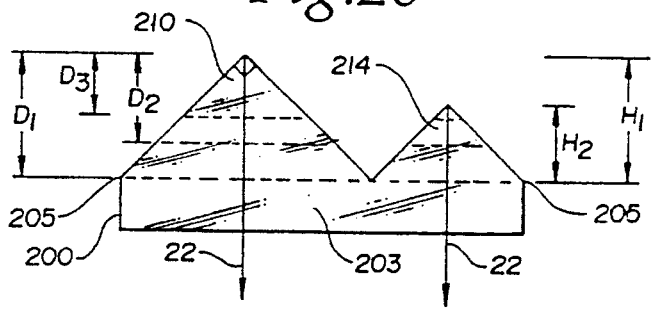
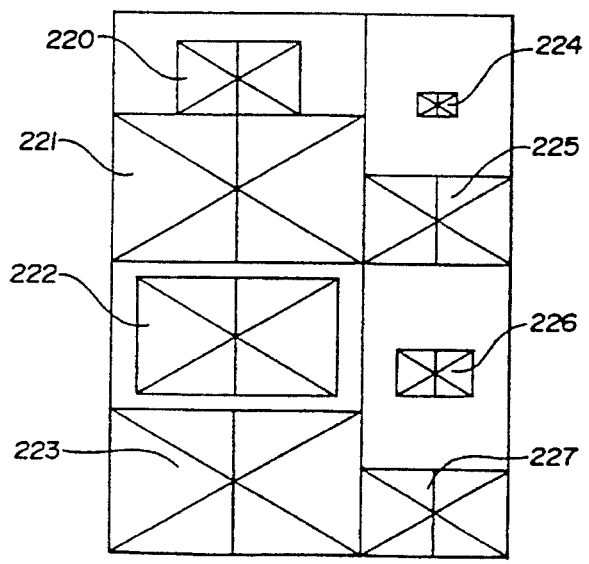

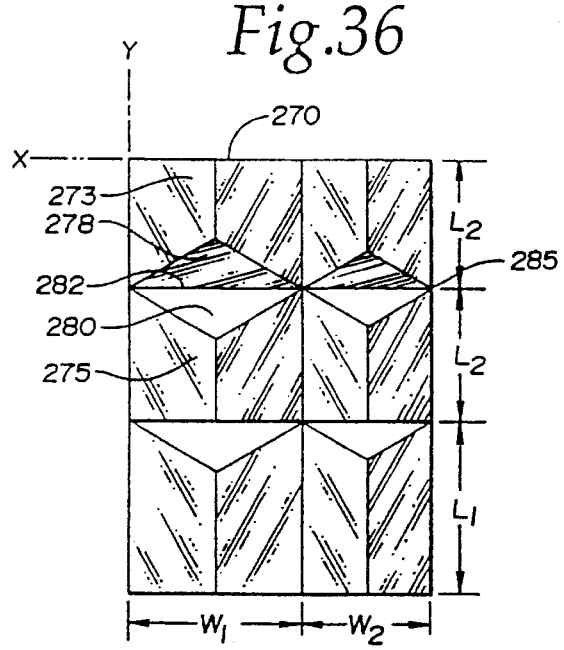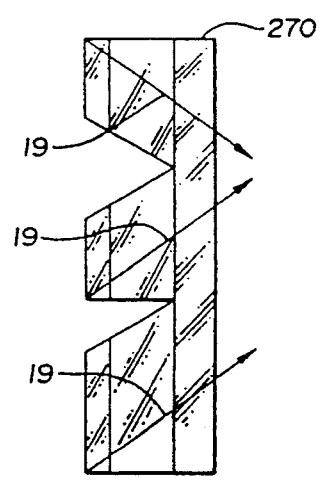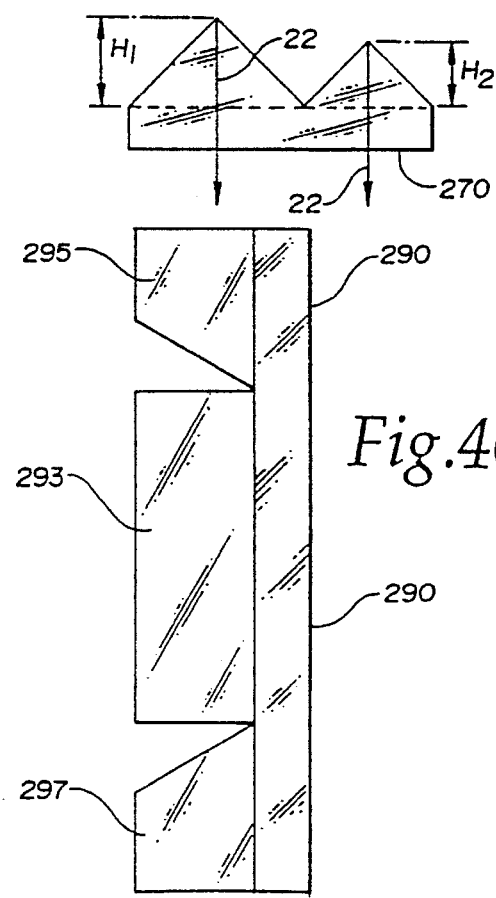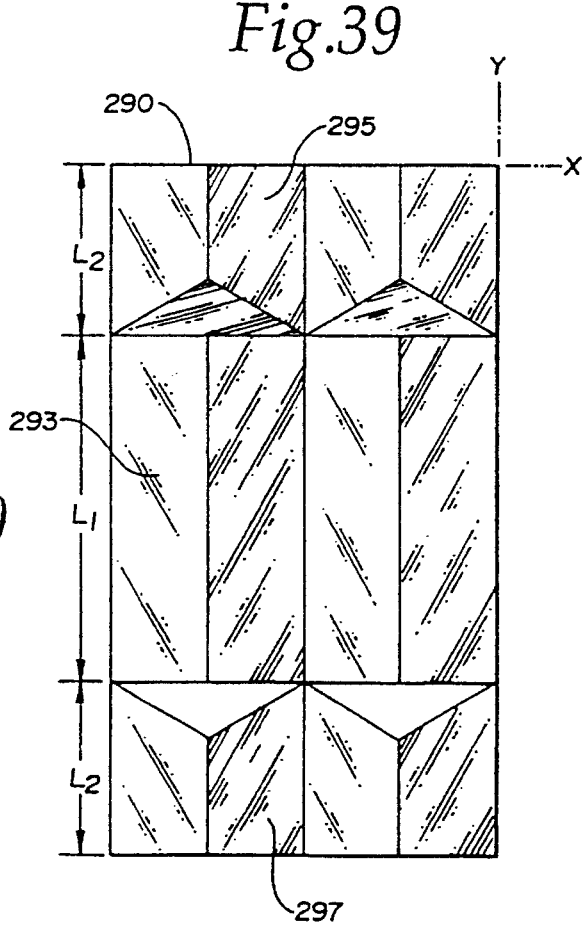

DUAL GROOVE SET RETROREFLECTIVE CUBE CORNER ARTICLE AND METHOD OF MANUFACTURE

FIELD OF THE INVENTION

This invention relates to retroreflective cube corner element articles having prismatic retroreflective elements.

BACKGROUND OF THE INVENTION

Many types of retroreflective elements are known, including prismatic designs incorporating one or more geometric structures commonly known as cube corners. Retroreflective sheeting which employs cube corner type reflecting elements is well known. Cube corner reflecting elements are trihedral structures which have three approximately mutually perpendicular lateral faces meeting in a single corner. Light rays are typically reflected at the cube faces due to either total internal reflection or reflective coatings. The manufacture of directly machined arrays comprising retroreflective cube corner elements has many inefficiencies and limitations. Divergence profile, design flexibility, and optical performance are adversely affected by these limitations, and overall production costs versus performance are often higher relative to the new class of articles and methods of manufacture taught below.

SUMMARY OF THE INVENTION

The invention comprises a method of machining a cube corner article. The method includes the steps of directly machining two groove sets each comprising at least two grooves into a substrate to produce a plurality of geometric structures including cube corner elements, and configuring at least two of the grooves in at least one of the sets at a different groove depth.

The invention comprises a method of machining a cube corner article. The method includes the steps of directly machining two groove sets each comprising at least two grooves into a substrate to produce a plurality of geometric structures including cube corner elements, and configuring at least two of the cube corner elements so that each has a different height above a common reference plane.

The invention comprises a method of machining a cube corner article. The method includes the steps of directly machining two groove sets each comprising at least two grooves into a substrate to produce a plurality of geometric structures including cube corner elements, and configuring at least two of the cube corner elements so that the size of the active apertures differ in both an x and y direction at a non-zero entrance angle.

The invention comprises a method of machining a cube corner article. The method includes the steps of directly machining two groove sets each comprising at least two grooves into a substrate to produce a plurality of different geometric structures including cube corner elements, and configuring the groove sets so that the cube corner elements have parallel bisectors.

The invention comprises a method of machining a cube corner article. The method includes the steps of directly machining two groove sets each comprising at least two grooves into a substrate to produce a plurality of geometric structures including cube corner elements having parallel symmetry axes, and varying the spacing of grooves within at least one of the groove sets so that the spacing between a first groove and an adjacent second groove differs from the spacing between the second groove and an adjacent third groove.

The invention comprises a method of machining a cube corner article. The method includes the steps of directly machining two groove sets each comprising at least two grooves into a substrate to produce a plurality of geometric structures including cube corner elements, and varying the spacing of grooves within at least one of the groove sets so that at least two of the cube corner elements have different lengths.

The invention comprises a method of machining a cube corner article. The method includes the steps of directly machining two groove sets each comprising at least two grooves into a substrate to produce a plurality of geometric structures including cube corner elements, and arranging at least two of the elements to have opposing orientations of element non-retroreflective triangular faces.

The invention comprises a retroreflective cube corner article which is a replica of a directly machined substrate in which a plurality of geometric structures including cube corner elements are machined in the substrate using only two sets of parallel grooves, and at least two of the grooves in at least one of the groove sets are at a different groove depth.

The invention comprises a retroreflective cube corner article which is a replica of a directly machined substrate in which a plurality of geometric structures including cube corner elements are machined in the substrate using only two sets of parallel grooves, and at least two of the cube corner elements have different heights above a common reference plane.

The invention comprises a retroreflective cube corner article which is a replica of a directly machined substrate in which a plurality of geometric structures including cube corner elements are machined in the substrate using only two sets of parallel grooves, and at least two of the cube corner elements are machined so that the size of the active apertures differ in both an x and y direction at a non-zero entrance angle.

The invention comprises a retroreflective cube corner article which is a replica of a directly machined substrate in which a plurality of different geometric structures including cube corner elements having parallel bisectors are machined in the substrate using only two sets of parallel grooves.

The invention comprises a retroreflective cube corner article which is a replica of a directly machined substrate in which a plurality of geometric structures including cube corner elements having parallel symmetry axes are machined in the substrate using only two sets of parallel grooves. The spacing between a first groove and an adjacent second groove in a groove set differs from the spacing between the second groove and an adjacent third groove in the groove set.

The invention comprises a retroreflective cube corner article which is a replica of a directly machined substrate in which a plurality of geometric structures including cube corner elements are machined in the substrate using only two sets of parallel grooves. The spacing in at least one of the groove sets is varied so that at least two of the cube corner elements have different lengths.

The invention comprises a retroreflective cube corner article which is a replica of a directly machined substrate in which a plurality of geometric structures including cube corner elements are machined in the substrate using only two sets of parallel grooves. At least two of the elements have opposing orientations of element non-retroreflective triangular faces.

The invention comprises a retroreflective cube corner element composite sheeting comprising a plurality of zones of retroreflective cube corner elements. Each zone comprises a replica of a directly machined substrate in which a plurality of cube corner elements are machined. the composite sheeting comprises at least one zone in which at least two geometric structures including cube corner elements are formed from two sets of parallel grooves. The geometric structures have different heights above a common reference plane.

The invention comprises a retroreflective cube corner element composite sheeting comprising a plurality of zones of geometric structures including retroreflective cube corner elements. Each zone comprises a replica of a directly machined substrate in which a plurality of cube corner elements are machined. The composite sheeting comprises at least one zone in which the grooves are formed from two sets of parallel grooves and at least two of the grooves in at least one of the groove sets are at a different groove depth.

The invention comprises a retroreflective cube corner element composite sheeting comprising a plurality of zones of retroreflective cube corner elements. Each zone comprises a replica of a directly machined substrate in which a plurality of cube corner elements are machined. The composite sheeting comprising at least one zone in which at least two geometric structures including cube corner elements are machined using two sets of grooves so that the size of the active apertures differ at a non-zero entrance angle.

The invention comprises a retroreflective cube corner element composite sheeting comprising a plurality of zones of retroreflective cube corner elements. Each zone comprises a replica of a directly machined substrate in which a plurality of cube corner elements are machined. The composite sheeting comprising at least one zone in which a plurality of geometric structures including cube corner elements are formed using two groove sets.

The invention comprises a retroreflective cube corner element composite sheeting comprising a plurality of zones of retroreflective cube corner elements. Each zone comprises a replica of a directly machined substrate in which a plurality of cube corner elements are machined. The composite sheeting comprising at least one zone formed using two sets of parallel grooves in which the spacing of grooves within at least one of the groove sets varies so that at least two of the cube corner elements have different lengths.

BRIEF DESCRIPTION OF THE DRAWINGS

FIG. 7 is a section view of an array similar to that shown in FIG. 4 including a canted cube corner element.

FIG. 8 is a plan view of a portion of a directly machined dual groove set array having variable spacing between grooves.

FIG. 9 is a section view taken along line 9—9 in FIG. 8.

FIG. 10 is a section view taken along line 10—10 in FIG. 8.

FIG. 11 is a view at a 60° entrance angle of some of the active apertures of the array shown in FIGS. 8–10.

FIG. 18 is a plan view of a portion of a directly machined dual groove set array having variable depths of grooves.

FIG. 19 is a section view of the array taken along line 19—19 in FIG. 18.

FIG. 20 is a section view of the array taken along line 20—20 in FIG. 18.

FIG. 21 is a view at a 60° entrance angle of the active apertures of the array shown in FIGS. 18–20.

FIG. 25 is a plan view of a portion of a directly machined dual groove set array having variable depths of grooves, variable groove spacing, and variable cube heights.

FIG. 26 is a side view of the array of FIG. 25.

FIG. 27 is a section view of the array taken along line 27—27 in FIG. 25.

FIG. 28 is a view at a 60° entrance angle of the active apertures of the array shown in FIGS. 25–27.

FIG. 36 is a plan view of a portion of a directly machined dual groove set array having variable groove spacing and variable cube heights.

FIG. 37 is a side view of the array of FIG. 36, including individual cube symmetry axes.

FIG. 38 is a side view of the array of FIG. 36, including individual cube bisectors.

FIG. 39 is a plan view of a portion of a directly machined dual groove set array having variable groove spacing.

FIG. 40 is a scaled side view of the array of FIG. 39.

DETAILED DESCRIPTION OF THE INVENTION

Figure 1:
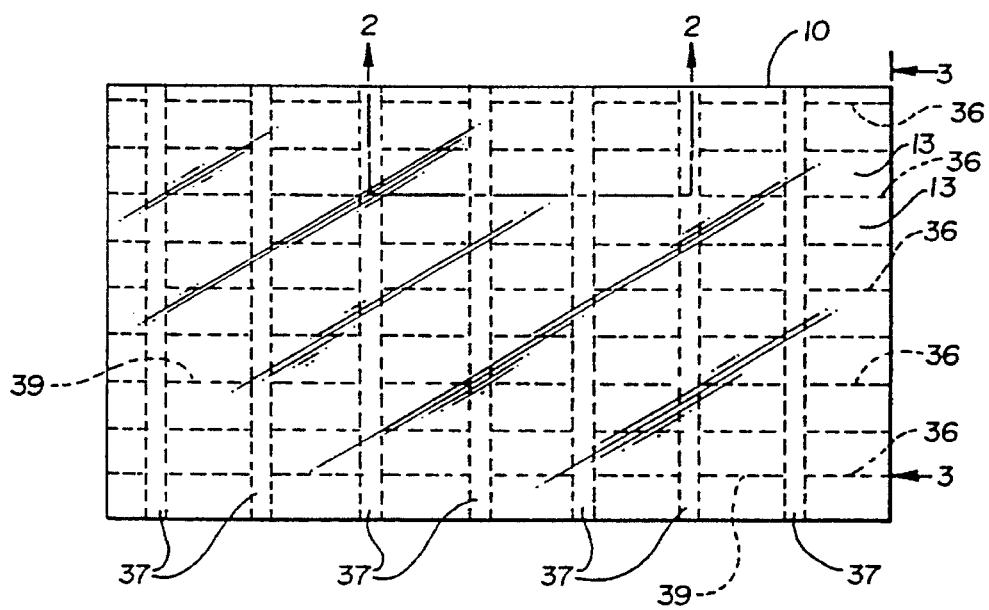
FIG. 1 is a plan view of a known two groove set directly machined array.

The manufacture of retroreflective cube corner element arrays is accomplished using molds made by different techniques, including those known as pin bundling and direct machining. Molds manufactured using pin bundling are made by assembling together individual pins which each have an end portion shaped with features of a cube corner retroreflective element. Examples of pin bundling include U.S. Pat. No. 3,926,402 to Heenan et al., and United Kingdom Patents Nos. 423,464 and 441,319 to Leray.

The direct machining technique, also known generally as ruling, comprises cutting portions of a substrate to create a pattern of grooves which intersect to form cube corner elements. Examples of ruling, shaping, and milling techniques suitable for forming grooves are discussed by Stamm in U.S. Pat. No. 3,712,706. The grooved substrate is referred to as a master from which a series of impressions, i.e., replicas, may be formed. In some instances, the master is useful as a retroreflective article, however, replicas, including multigenerational replicas, are more commonly used as a retroreflective article. Direct machining is an excellent method for manufacturing master molds with small micro-cube arrays. Micro-cube arrays are particularly beneficial for producing thin replica arrays with improved flexibility, such as continuous rolled goods for sheeting purposes. Micro-cube arrays are also conducive to continuous process manufacturing. The process of manufacturing large arrays is also relatively easier using direct machining methods rather than other techniques. Examples of direct machining are shown in U.S. Pat. No. 4,588,258, issued to Hoopman, and U.S. Pat. No. 3,712,706 issued to Stamm, which disclose single or multiple passes of a machine tool having two opposing cutting surfaces for cutting grooves to form cube corner optical faces in a substrate. It is recognized that directly machined grooves are preferably machined as groove sets comprising a plurality of separate and parallel grooves. Examples of direct machining involving only two sets of grooves are shown in U.S. Pat. No. 4,349,598 to White and U.S. Pat. Nos. 4,895,428 and 4,938,563 to Nelson et al, both of which are discussed in greater detail below.

Conventional retroreflective cube corner element arrays are derived from a single type of matched pairs, i.e. geometrically congruent cube corner retroreflecting elements rotated 180°. These elements are also typically the same height above a common reference plane, are bounded by grooves having identical groove depths, and are of the same element length. The highest points in conventional three groove arrays are defined by the cube peaks. Examples of this fundamental matched pair concept relating to conventional cube arrays is shown in U.S. Pat. No. 3,712,706 to Stamm, U.S. Pat. No. 4,588,258 to Hoopman, U.S. Pat. No. 1,591,572 to Stimson, and U.S. Pat. No. 2,310,790 to Jungerson. U.S. Pat. No. 5,122,902 to Benson discloses another example of matched pairs of cube corner retroreflective elements having coincident base edges, although these may be positioned adjacent and opposite to each other along a separation surface.

The above examples of cube corner element retroreflective arrays generally comprise cubes in which the orientation of the individual cube symmetry axes are controlled relative to a base plane. The symmetry axis is a central or optical axis which is a trisector of the internal or dihedral angle defined by the faces of the element. In some practical applications it is advantageous to cant or tilt the symmetry axes of the matched pair of cube corner retroreflective elements to an orientation which is not perpendicular to the base plane, resulting in canted cube corner arrays which retroreflect over a wide range of entrance angles. Entrance angle is commonly defined as the angle formed between the light ray entering the front surface of an array and a vector that is perpendicular to the front surface. Canting of cube corner elements is taught, for example, in U.S. Pat. No. 4,588,258 to Hoopman.

Canting of cube corner elements may be in either a forward or backward direction. The Hoopman patent includes disclosure of a structure having an amount of cant up to 13° for a refractive index of 1.5. Hoopman also discloses a cube with a cant of 9.736°. This geometry represents the maximum forward cant of cubes in a conventional array before the grooving tool damages cube optical surfaces. The damage normally occurs during formation of a third groove when the tool removes edge portions of adjacent elements. U.S. Pat. No. 2,310,790 to Jungersen discloses a structure which is canted in a direction opposite that shown in the Hoopman patent.

For these conventional arrays, optical performance is conveniently defined by the percent of the surface area that is actually retroreflective, i.e. which comprises an effective area or active aperture. The percent active aperture varies as a function of the amount of canting, refractive index, and entrance angle. At non-zero entrance angles, conventional three groove arrays display, at most, two different aperture shapes of roughly similar size. These result from the single type of geometrically congruent matched pairs of conventional cube corner elements. Canted conventional cube corner arrays exhibit similar trends, although the shape of the aperture is affected by the degree of canting.

Figure 2:
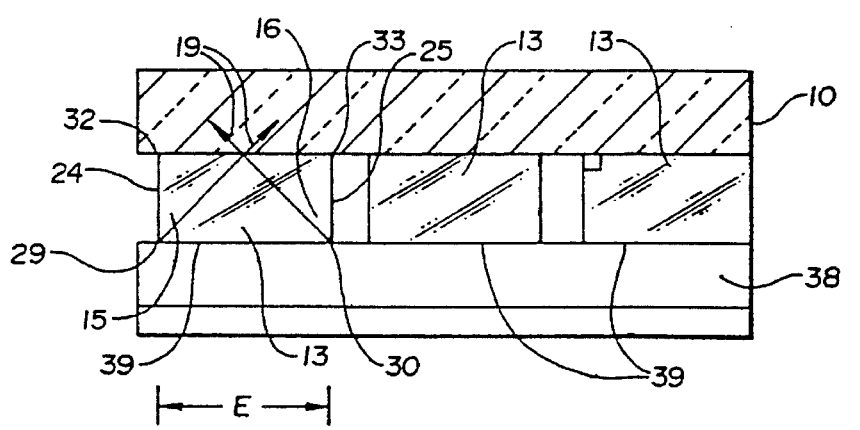
FIG. 2 is a section view of the array taken along line 2—2 in FIG. 1.
Figure 3:
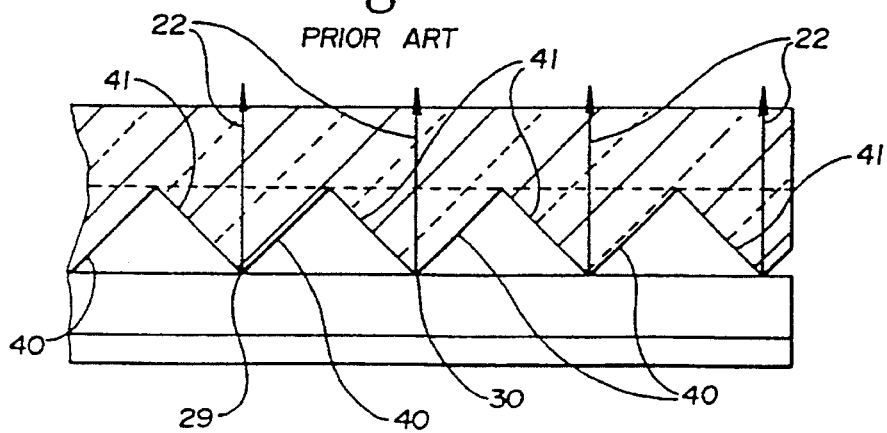
FIG. 3 is an end view of the array taken along line 3—3 in FIG. 1.

Some conventional cube corner arrays are manufactured with additional optical limitations, perhaps resulting from canting or other design features, to provide very specific performance under certain circumstances. One example of this type of array is disclosed in U.S. Pat. No. 4,349,598 to White. This array is shown in FIGS. 1, 2, and 3 which schematically depict plan, side, and end views respectively. Array 10 is an example of an extreme backward cant associated with one geometric limit of a conventional cube design. In this design, array 10 comprises a plurality of identical cube corner element geometric structures 13 derived from a matched pair of cube corner elements 15, 16 with non-parallel symmetry axes 19, shown in FIG. 2, and parallel bisectors 22, shown in FIG. 3. Bisectors 22 comprise line elements which each bisect the angle between the two lateral cube corner element optical faces 40, 41, and in this example perpendicularly intersect a base plane 23. Cube corner elements 15, 16 are each canted in a backward direction to the point that each of the base triangles is eliminated, resulting in two vertical optical faces 24, 25. This occurs when the cube peaks 29, 30 are directly above the base edges 32, 33, and the base triangles have merged to form a rectangle when viewed in plan aspect. Only two groove sets are required, using tools with opposing cutting surfaces, to create this cube structure in a substrate. One groove set has a 90° V-shaped cut 36 and the other groove set has a rectangular cut shaped as a channel 37, the latter cut providing vertical optical faces. Both sides of all grooves form cube corner element optical surfaces in array 10. Use of the rectangular channel 37 results in an array 10 in which the entire array surface is not covered with cube corner elements.

FIGS. 2 and 3 show use of a backing layer 38 which engages and seals array 10 along the entire length E of the long functional cube edge 39. The contact of this backing layer material is along the optical edge of the cube corner elements. Edge 39 for all identical cube structures 13 defines the highest points for cube corner element array 10. Contact with the backing layer 38 along this edge may significantly degrade optical performance by damaging the edge or by eliminating light ray retroreflection at the cube-backing layer interface. This problem is mitigated by use of the novel structures defined below in relation to FIGS. 8–45.

In the White design, the pair of cube corner reflecting elements are specifically arranged to provide a high active aperture at large entrance angles in two directions. All of the cube corner elements are at a uniform height and spacing, and the grooves are machined to a constant depth. This results in an array with cube corner element structures that are all identical, and which comprise parallel bisectors and non-parallel symmetry axes. U.S. Pat. No. 4,938,563 to Nelson et al further discloses an array having a plurality of identical geometric structures including cube corner elements. The Nelson et al elements are similar to the cube corner elements disclosed in the White design shown in FIGS. 1–3, but with introduction of, inter alia, slightly non-orthogonal optical surfaces. This is introduced as a means of controlling the divergence profile of the cube corner element structure.

Figure 4:
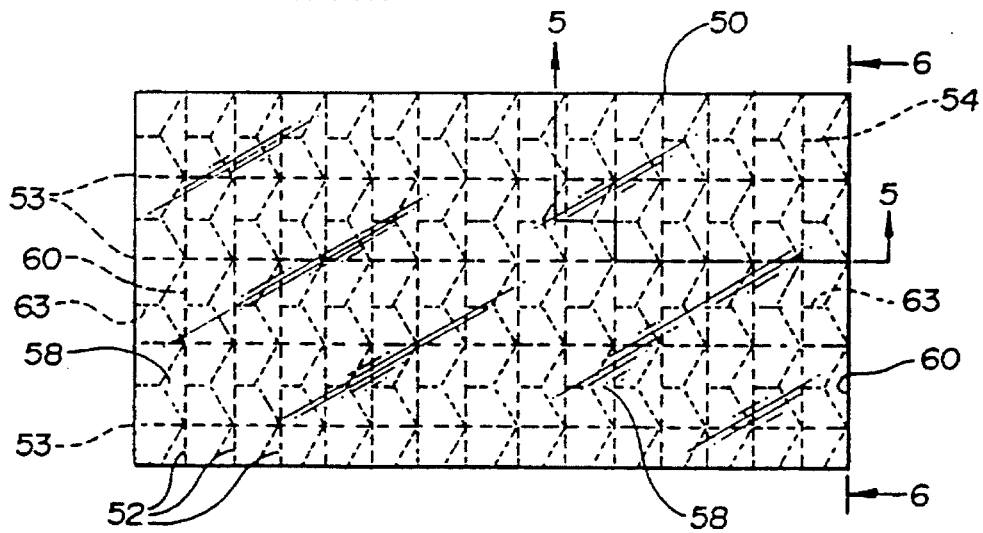
FIG. 4 is a plan view of a known two groove set directly machined array.

A further modification to the conventional cube corner arrays and to the design of FIG. 1 is disclosed in U.S. Pat. No. 4,895,428 to Nelson et al, which is shown in plan, side, and alternate end views respectively in FIGS. 4, 5, 6 and 7. As shown in FIG. 4, the array 50 comprising cube corner element structures 54 is derived by reducing the length of the White cube structure 13 and by eliminating one of the cube vertical optical faces 24 or 25. Like the White design, manufacture of the Nelson et al structure also requires only two groove sets 52, 53. Both sides of groove 53 and one side of groove 52 form cube corner element optical surfaces in array 50. The array must also have at least one vertical retroreflective face formed by groove 52. This is accomplished by replacing the tool for cutting the White rectangular channel with an offset tool. The Nelson et al tool forms a non-retroreflective triangular surface 58, using a tool relief surface, and a vertical retroreflective surface 60, using the tool vertical sidewall. The entire surface of array 50 is covered with cube corner elements uniformly oriented to provide high active aperture at large entrance angles in one direction.

Figure 5:
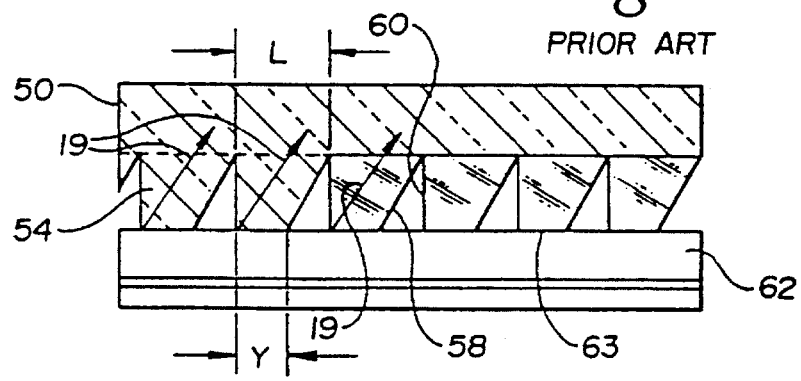
FIG. 5 is a section view of the array taken along line 5—5 in FIG. 4.
Figure 6:
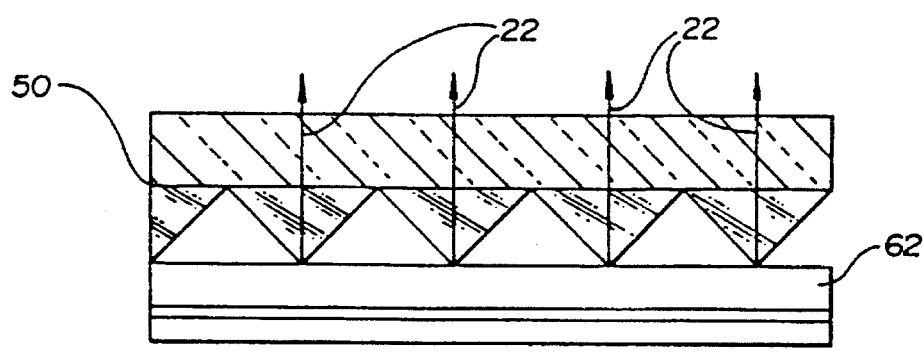
FIG. 6 is an end view of the array taken along line 6—6 in FIG. 4.

FIGS. 5 and 6 also show use of backing layer 62 which engages and seals array 50 along the entire length y of the line of intersection of the cube non-triangular faces comprising cube edge 63. Long functional cube edge 63 for all identical cube structures 54 defines the highest points for cube corner element array 50. Contact with the backing layer 62 along this edge may significantly degrade optical performance by damaging the edge or by eliminating light ray retroreflection at the cube-backing layer interface.

FIGS. 4–6 disclose an embodiment of the Nelson structure which comprises parallel symmetry axes 19 and parallel bisectors 22. FIG. 7 discloses an alternate embodiment array 51 which shows two retroreflective cube corner elements 64, 65. Element 64 comprises lateral faces 69, 70 which are bisected by bisector line 73, which is perpendicular to the plane of base 76. Element 65 comprises lateral faces 78, 79 which are bisected by bisector line 82 which is not perpendicular to the plane of base 76. The cant of element 65 is provided to improve angularity in a horizontal direction. This canting is accomplished while maintaining the height $H_1$ of elements 64, 65 constant and equal to the constant depth $D_1$ of grooves. The embodiment of array 51 shown in FIG. 7 is similar to an embodiment shown in U.S. Pat. No. 4,938,563 and U.S. Pat. No. 4,895,428. As shown in FIGS. 1–7, all of the White and Nelson references teach cube corner element structures having a constant length and height, a constant groove depth, and at least one vertical face formed with two groove sets.

As discussed in U.S. Pat. No. 5,171,624 to Walter, diffraction from the active apertures in nearly orthogonal conventional cube corner arrays tends to produce undesireable variations in the energy pattern or divergence profile of the retroreflective light. This results from all the active apertures being roughly the same size in conventional arrays and therefore exhibiting roughly the same degree of diffraction during retroreflection. The introduction of slightly non-orthogonal faces in a two groove set design array, to the degree necessary to affect the divergence profile in other than a very small manner, is more difficult than in arrays formed with three groove sets. This is because angles greater than 90° cause physical interlocking of materials during replication. Therefore, in order to control the divergence profile in a dual groove set array design it is much more useful to employ cube corner elements having the novel feature of variable size active apertures. These are used to control diffraction and therefore divergence profile shape. Preferably, the aperture shape is controlled in both an x and y direction, as shown in FIGS. 11, 17, 21, 28, 32, and 42.

The invention comprises achievement of optical advantages by shaping the divergence profile as described above, as well as by controlling the shape of the multiple geometric structures in each array by use of varying groove depths and spacing, variable lengths of elements, and variable heights of structures. Each groove forms the side surfaces of geometric structures which may include cube corner optical elements. Grooves may be formed using either single or multiple passes of a machine tool through a substrate. Groove sets are comprised of parallel grooves in the substrate.

FIGS. 8–10 disclose directly machined array 100 having a plurality of geometric structures including cube corner elements 103, 105 each having different features of height and width. FIG. 9 shows width $W_1$ of one of the elements 103 which is wider than the width $W_2$ of one of the elements 105. This is also an example of variable groove spacing in an x axis direction of grooves machined in a y axis direction. Similarly, height $H_1$ of an element 103, measured from a reference of base 107 to the highest edge of the element at peak 110, is higher than height $H_2$ of one of elements 105 each having an upper edge 112. The novel feature of variable cube height reduces damage to the cube edges for lower structures, such as edge 112. Damage to the highest structures including cubes might occur during handling of the sheeting or due to contact with a backing layer during sealing. For conventional arrays with constant height cubes, all edges may be damaged and optical performance degraded during handling or sealing.

FIG. 11 shows a representative section of percent active aperture of array 100 at an entrance angle of 60° and a refractive index of 1.59. The variable spacing and height of elements within the array creates multiple aperture sizes, as shown by apertures 115, 116.

Figure 13:
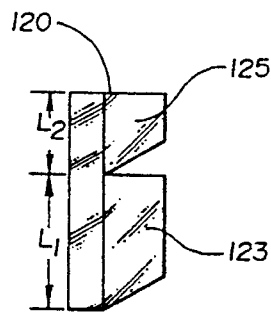
FIG. 13 is a side view of the array of FIG. 12.
Figure 12:
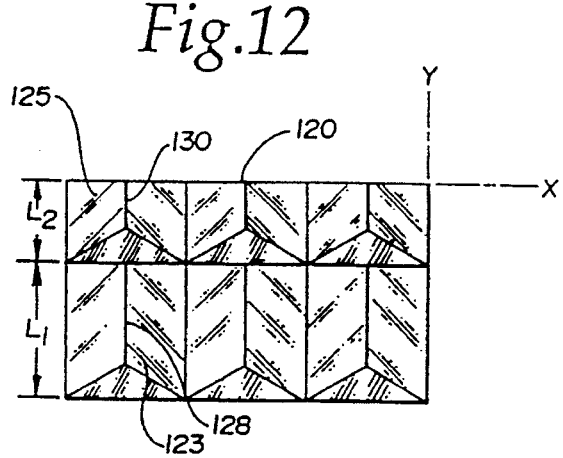
FIG. 12 is a plan view of a portion of a directly machined dual groove set array having variable spacing between grooves and variable length.

FIGS. 12 and 13 disclose views of array 120 having a plurality of cube corner elements with variable groove spacing along a y axis of grooves oriented in an x axis. This produces cube elements 123, 125 with different element lengths $L_1$ and $L_2$. This also results in different cube edge lengths along cube edges 128, 130.

Figure 14:
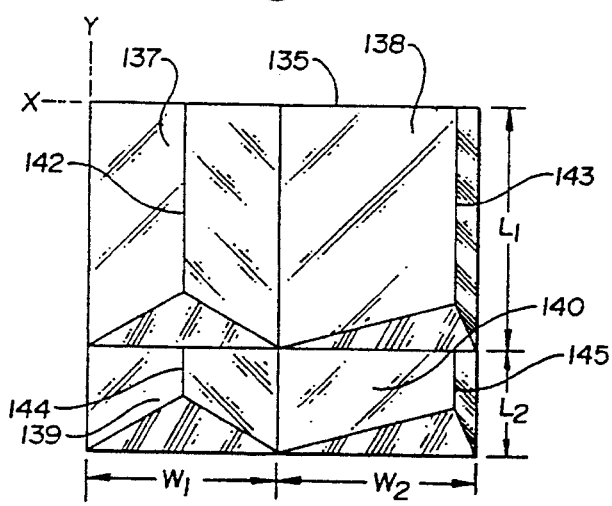
FIG. 14 is a plan view of a portion of a directly machined dual groove set array having variable spacing between grooves and some canted elements.
Figure 15:
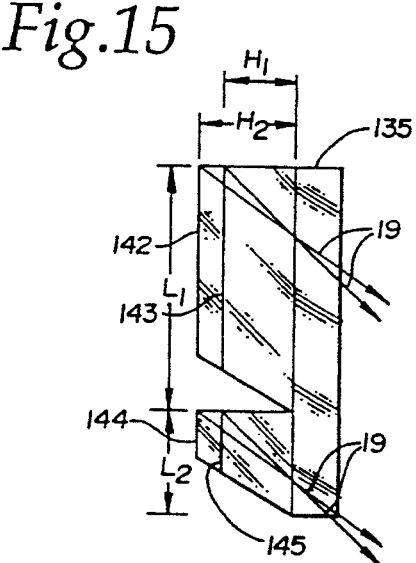
FIG. 15 is a side view of the array of FIG. 14, including individual cube symmetry axes.
Figure 16:
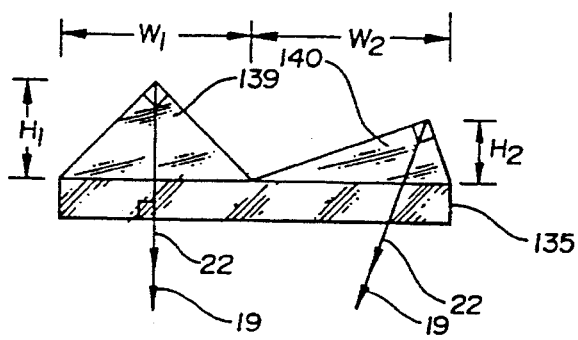
FIG. 16 is a side view of the array of FIG. 14, including individual cube symmetry and bisector axes.

FIGS. 14–16 disclose views of array 135 which disclose the partially canted multiple structure design of the array comprising cube corner elements 137, 138, 139, and 140. This design comprises variable groove spacing in both the x and y directions. This produces cube corner elements 137, 138 each with uniform length $L_1$ that is different from length $L_2$ of elements 139, 140. However, elements 137, 139 each have an identical width $W_1$ which is different from the width $W_2$ of either of the elements 138, 140. This array design also results in different cube edge lengths along each of the cube edges 142, 143, 144, 145.

Array 135 is machined so that elements 138, 140 are canted. The combination of this cant with the above features produces an array with elements having non-parallel symmetry axes 19, shown in FIG. 15, and nonparallel bisectors 22, shown in FIG. 16.

Figure 17:
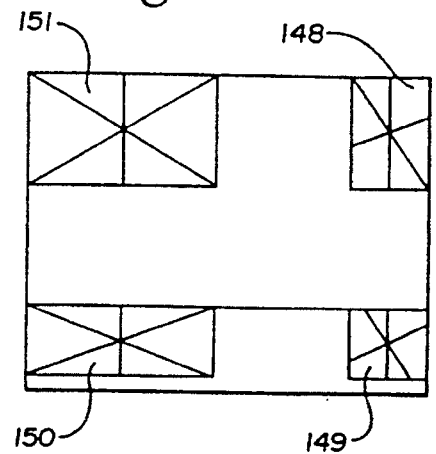
FIG. 17 is a view at a 60° entrance angle of the active apertures of the array shown in FIGS. 14–16.

FIG. 17 discloses the multiple shapes and sizes of the active apertures corresponding to the multiple cube corner element structures of array 135. The variable spacing, heights, and widths, and the canting of the array creates four different active aperture sizes and shapes as shown by apertures 148, 149, 150, and 151. This plurality of active aperture sizes and shapes greatly enhances the design flexibility of such arrays to achieve improved optical performance, including improved divergence profile uniformity, at various entrance angles, as well as enhancing marketing of these tailorable arrays.

FIGS. 18–20 disclose views of array 160 comprising many of the novel design features relating to variable groove depth and multiple active aperture sizing and shaping without reliance on non-orthogonal constructions. Array 160 comprises a plurality of cube corner elements 163, 164 machined in substrate 165 with two groove sets each comprising a plurality of parallel grooves. A first groove set comprises grooves 167 arranged in a y orientation. A second groove set comprises grooves 169, 171 arranged in an x orientation, but at different depths of cut $D_1$, $D_2$ respectively. This creates two different length cube edges 174, 176. Cube corner elements 163, 164 share a common optical surface 178, as shown in FIG. 19.

FIG. 21 discloses the multiple sizes of the active apertures corresponding to the multiple cube corner element structures of array 160. The variable groove depth, and, therefore, variable size of the cube corner element triangular face and length of cube edge creates two different active aperture sizes as shown by apertures 180, 183.

Figure 22:
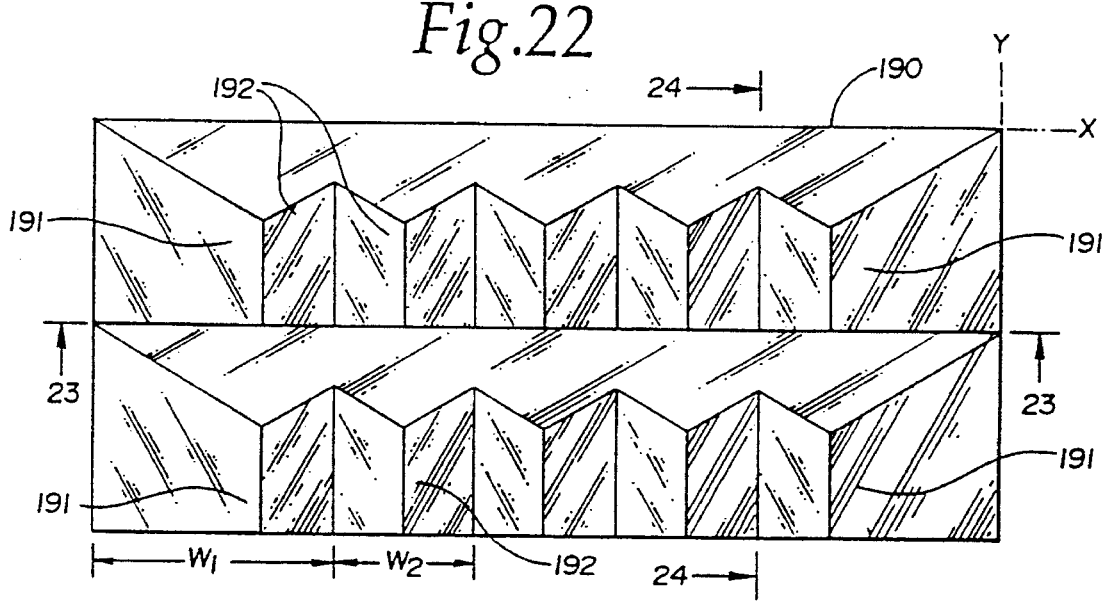
FIG. 22 is a plan view of a portion of a directly machined dual groove set array having variable depths of grooves and variable groove spacing.
Figure 23:
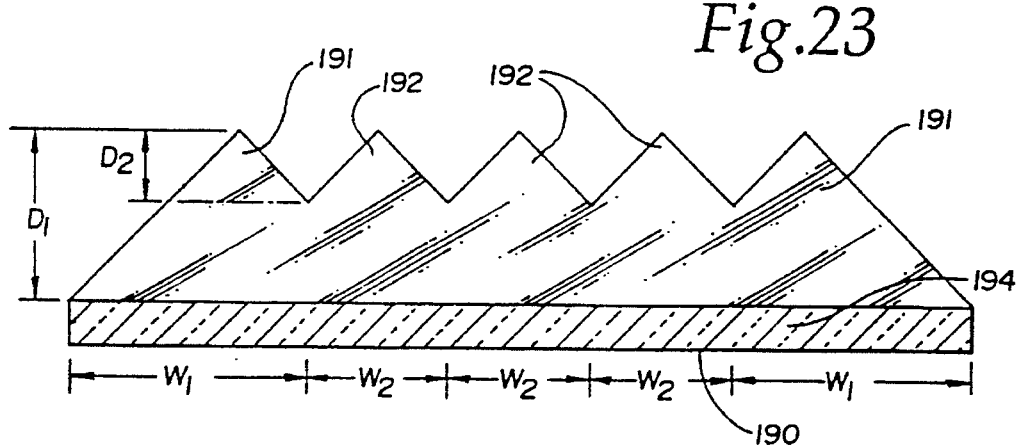
FIG. 23 is a section view of the array taken along line 23—23 in FIG. 22.
Figure 24:
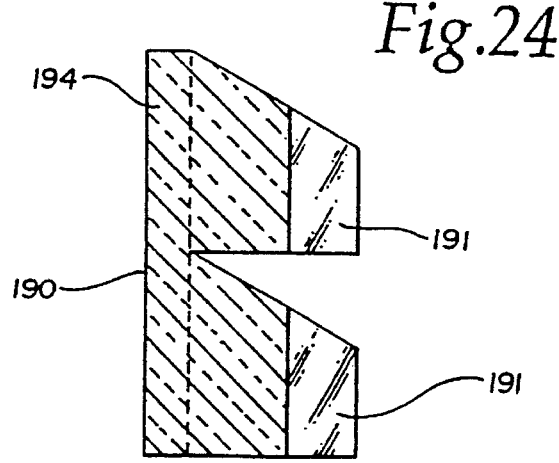
FIG. 24 is a section view of the array taken along line 24—24 in FIG. 22.
Figure 29:
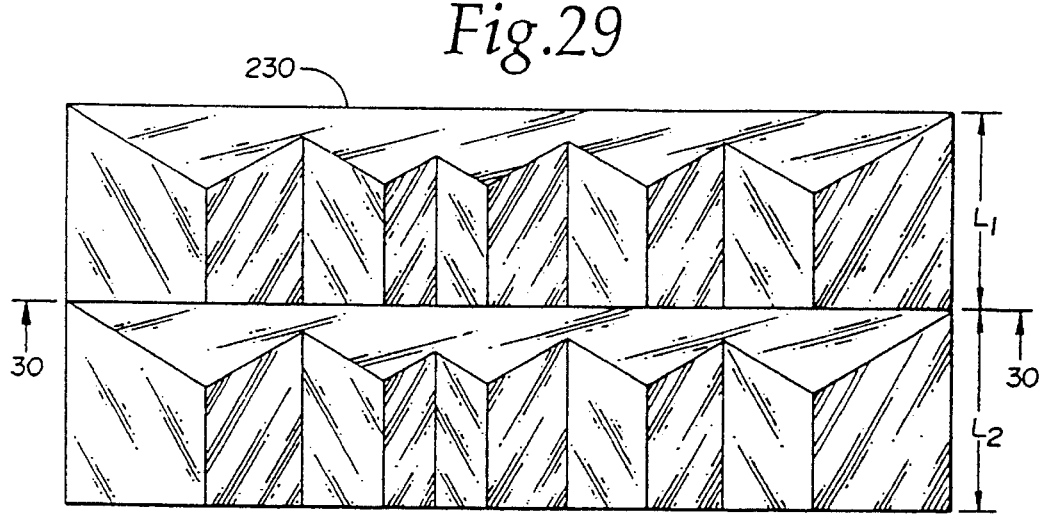
FIG. 29 is a plan view of a portion of a directly machined dual groove set array having variable depths of grooves, variable groove spacing, and variable cube heights.

FIGS. 22–24 disclose views of array 190 which comprise the novel features of variable spacing of grooves and variable groove depths within a groove set. Array 190 comprises a plurality of cube corner elements 191, 192 formed with two sets of parallel grooves machined into substrate 194, with each cube corner element having a vertical optical face. Various configurations of spacing and depths are possible, as shown in other Figures. However, in this embodiment a first groove set is machined at uniform distances between grooves for grooves with an x orientation. Different groove depths $D_1$, $D_2$ may be used for grooves within any groove set to form all of the geometric structure side surfaces, or lateral surfaces, which may comprise cube corner element optical or non-optical surfaces. In this context, "optical portion" refers to a surface which is actually retroreflective at some entrance angle. A second groove set is machined at varied groove distances between y oriented grooves. This is depicted by the difference between widths $W_1$ and $W_2$.

FIGS. 25–27 disclose views of array 200 comprising a plurality of cube corner elements created by directly machining two groove sets each comprising a plurality of parallel grooves into substrate 203. In this embodiment, the grooves 205, which are oriented in a y direction, are machined to a uniform depth but with variable spacing. The grooves 217, which are oriented in an x direction are machined to produce different depths of cut, shown in FIG. 27 as depths $D_1$, $D_2$, and $D_3$. This results in cube corner elements 207, 208, 209, and 210 having a width $W_1$ and a height $H_1$, and cube corner elements 211, 212, 213, and 214 having a different width $W_2$ and a different height $H_2$. Grooves 217 are also machined at variable spacings between grooves, resulting in cube elements having different lengths, as shown by element lengths $L_1$ and $L_2$. Symmetry axes 19 and bisector axes 22 are parallel for all cubes in array 200.

All of these novel design features create a diverse pattern of active aperture sizes which are quite useful for achieving a desired divergence profile. The multiple active apertures are depicted in FIG. 28 as apertures 220, 221, 222, 223, 224, 225, 226, and 227. These apertures correspond to cube corner elements 207, 208, 209, 210, 211, 212, 213, and 214. The enhanced optical performance and design flexibility resulting from these multiple structure techniques and concepts relates directly to improved product performance, cost efficiencies, and marketing advantages.

Total light return for retroreflective sheeting is derived from the product of percent active aperture and retroreflected light ray intensity. For some combinations of cube geometries, entrance angles, and refractive index, significant reductions in ray intensity may result in relatively poor total light return even though percent active aperture is relatively high. One example is retroreflective cube corner element arrays which rely on total internal reflection of the retroreflected light rays. Ray intensity is substantially reduced if the critical angle for total internal reflection is exceeded at one of the cube faces. Metallized or other reflective coatings on a portion of an array may be utilized advantageously in such situations. For example, a particular portion of an array which has cube surfaces contacting a sealing medium will often be more reflective when the surfaces have a reflective coating. Alternately, a portion may comprise an entire array.

FIGS. 29–32 disclose views of another array 230 comprising a plurality of cube corner elements having different heights $H_1$, $H_2$, lengths $L_1$, $L_2$, widths $W_1$, $W_2$, $W_3$, groove depths $D_1$, $D_2$, $D_3$, and active aperture sizes shown as different elements 233, 234, 235, 236, and 237.

Figure 30:
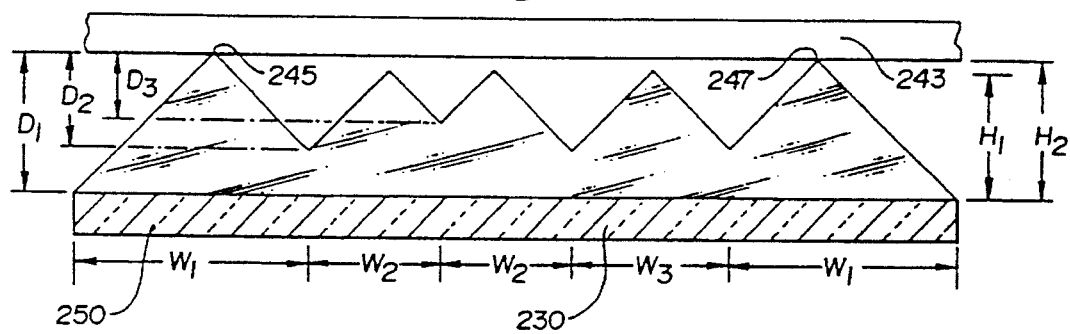
FIG. 30 is a section view of an array taken along line 30—30 in FIG. 29, and with a sealing medium added to the array.
Figure 31:
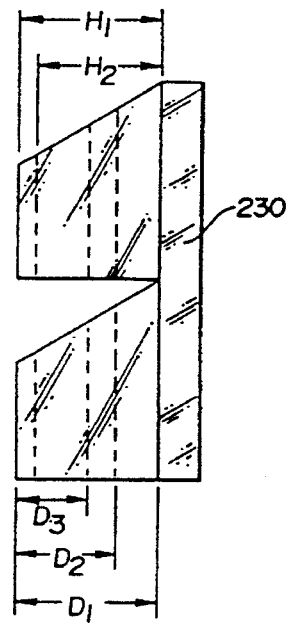
FIG. 31 is a side view of the array of FIG. 29.
Figure 32:
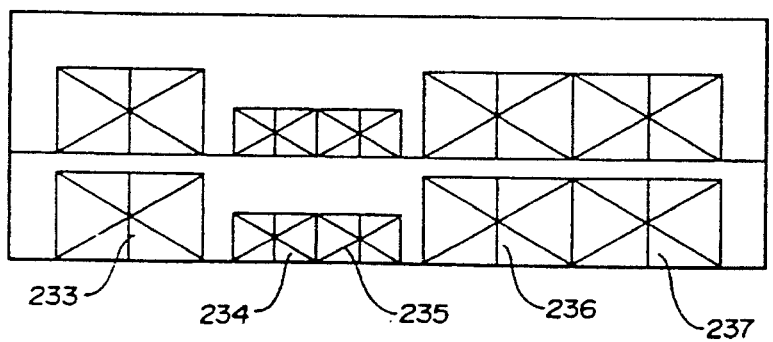
FIG. 32 is a view at a 60° entrance angle of the active apertures of the array shown in FIGS. 29–31.

As shown above, retroreflective directly machined cube corner articles are often designed to receive a sealing film which is applied to the retroreflective article in order to maintain a low refractive index material, such as air, next to the retroreflective elements for improved performance. In conventional arrays this medium is often placed in direct contact with the cube corner elements in ways which degrade total light return. However, using the novel constructions of this invention, a sealing medium 243 may be placed on the highest surface of the array without contacting and degrading the optical properties of lower retroreflective cube corner elements. The highest surface preferably comprises cube corner elements, although it may also comprise non-retroreflective pyramids, frustums, posts, or other structures. FIG. 30 includes an optional sealing medium 243, not shown in the other figures, which is positioned on the highest cube edges 245, 247 above base 250. This is one example of the advantages of manufacturing methods which provide arrays with a plurality of geometric structures including retroreflective cube corner elements at different heights above a common reference plane and utilizing varying depth of groove during machining. Although slight height variations may result from slight non-uniformity of groove positions or included angle of cube corner elements due to machining tolerances or intentional inducement of non-orthogonality, these variations are not analogous to the variations disclosed and taught in this invention. For arrays using a sealing medium, the supporting surfaces may be used both to hold the medium above cube corner elements as well as to increase the light transmissivity of the sheeting. Light transmissivity of the sheeting may be increased through use of a transparent or partially transparent sealing medium.

Figure 33:
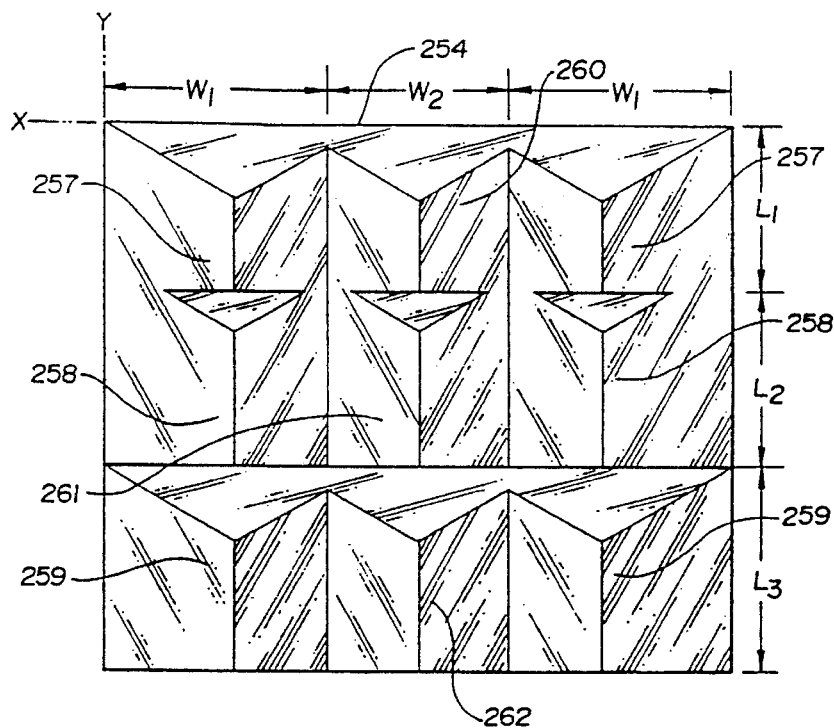
FIG. 33 is a plan view of a portion of a directly machined dual groove set array having variable depths of grooves and variable groove spacing.
Figure 35:
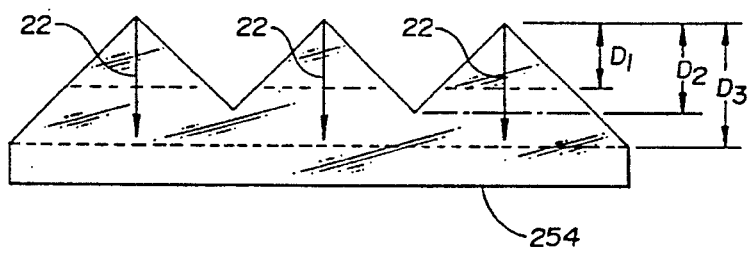
FIG. 35 is a side view of the array of FIG. 33, including individual cube bisectors.
Figure 34:
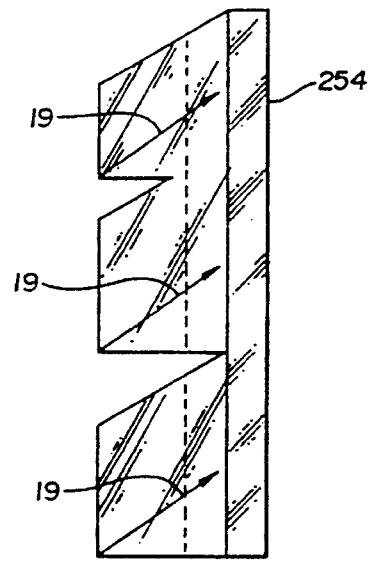
FIG. 34 is a side view of the array of FIG. 33, including individual cube symmetry axes.

FIGS. 33–35 disclose views of another directly machined array 254 comprising a plurality of cube corner elements 257, 258, 259, 260, 261, and 262 machined at various groove depths $D_1$, $D_2$, $D_3$ and various lengths $L_1$, $L_2$, $L_3$. Symmetry axes 19 and bisector axes 22 are parallel for all cubes in array 254. A variety of cube corner elements such as 257 and 258, as well as 258 and 261, share a common optical surface.

FIGS. 36–40 disclose views of another design of dual groove set directly machined arrays employing novel spacing and height features and comprising a plurality of elements similar to those disclosed in U.S. Pat. No. 4,895,428 to Nelson et al and U.S. Pat. No. 4,349,598 to White. However, as shown in the embodiments of these figures, at least two of the elements 273, 275 (FIG. 36) or 295, 297 (FIG. 39) have opposing orientations of element non-retroreflective triangular faces 278, 280 (FIG. 36), 298, 299 (FIG. 39). This may result in element non-retroreflective faces sharing a common edge along a groove, such as edge 282 and groove 285 in FIG. 36, or remaining separated by an intermediate structure as shown in FIG. 39. This design produces cube corner elements with parallel bisectors 22 and non-parallel symmetry axes 19 which essentially cover the entire surface of the array, and which provide a very high active aperture at large entrance angles in two directions. An alternative embodiment comprises use of multiple combinations of differently oriented cube corner elements selectively separated similar to that described above, but also including some rectangular cuts shaped as channels. A method of manufacturing these arrays includes directly machining two groove sets each comprising at least two grooves into a substrate to produce a plurality of geometric structures including cube corner elements, and arranging at least two of the elements to have opposing orientations of element non-retroreflective triangular faces. In one embodiment, the elements having an opposing relationship are geometrically identical. These elements may also comprise a portion of a composite array sheeting, as further discussed below.

FIGS. 39 is a plan view and FIG. 40 is a side view of a directly machined dual groove set array 290 comprising a plurality of variably spaced parallel grooves oriented in an x direction and a plurality of parallel grooves oriented in a y direction, shown in this example with constant spacing. This produces an array having a cube corner element 293 with a length $L_1$ which is different from a length $L_2$ in cube corner elements 295 and 297. The novel design of array 290 provides very good entrance angularity in two directions, while the entire array is covered with cube corner elements.

Other embodiments of this invention include creation of an article, or replicas of the article, which further modify the shape of the retroreflected light pattern. These embodiments comprise at least one groove side angle in at least one set of grooves which differs from the angle necessary to produce an orthogonal intersection with other faces of elements defined by the groove sides. Similarly, at least one set of grooves may comprise a repeating pattern of at least two groove side angles that differ from one another. Shapes of grooving tools, or other techniques, may create cube corner elements in which at least a significant portion of at least one cube corner element optical face on at least some of the cubes are arcuate. The arcuate face may be concave or convex. The arcuate face, which was initially formed by one of the grooves in one of the groove sets, is flat in a direction substantially parallel to said groove. The arcuate face may be cylindrical, with the axis of the cylinder parallel to said groove, or may have a varying radius of curvature in a direction perpendicular to said groove.

Composite tiling is the technique for combining zones of cube corner elements having different orientations. This is used with conventional arrays, such as disclosed in U.S. Pat. Nos. 4,202,600 to Burke at al and U.S. Pat. No. 4,243,618 to Van Arnam, to provide sheeting with a uniform appearance at high angles of incidence regardless of orientation. Composite tiling may also be introduced to provide symmetric optical performance with respect to changes in entrance angle using arrays which individually exhibit asymmetric entrance angularity, as well as to modify the optical performance of arrays comprising non-triangular based cube corner prisms.

Figure 41:
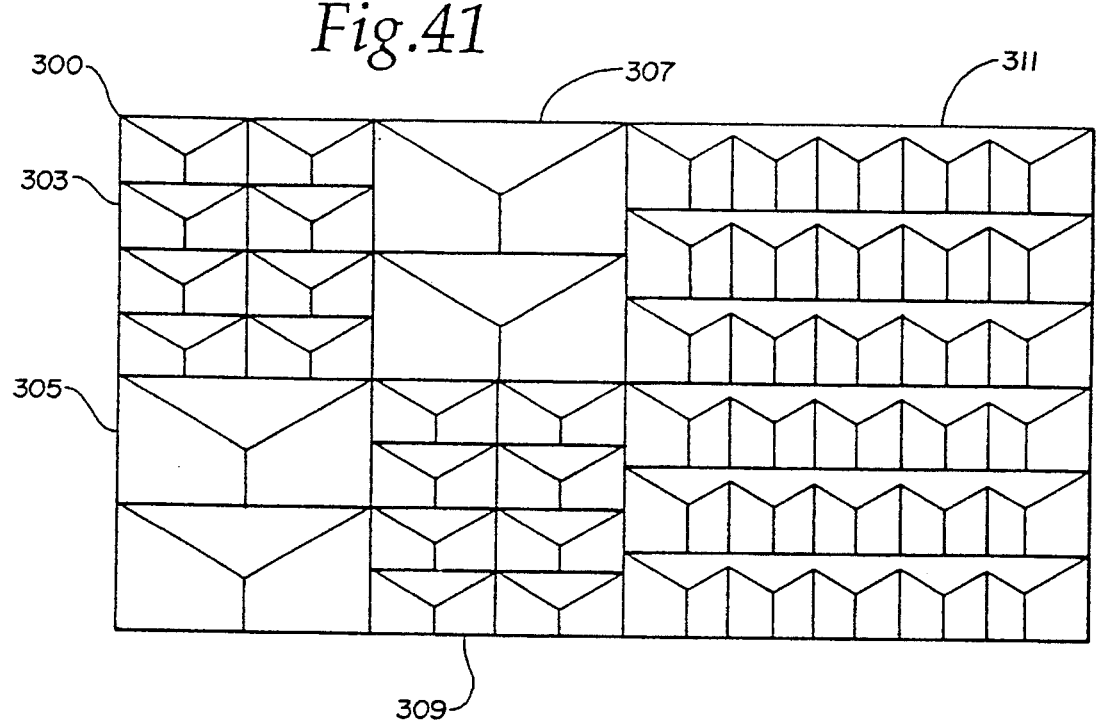
FIG. 41 is a plan view of a composite array formed with a plurality of zones of directly machined dual groove set arrays, with one zone having variable groove spacing and depth.
Figure 42:
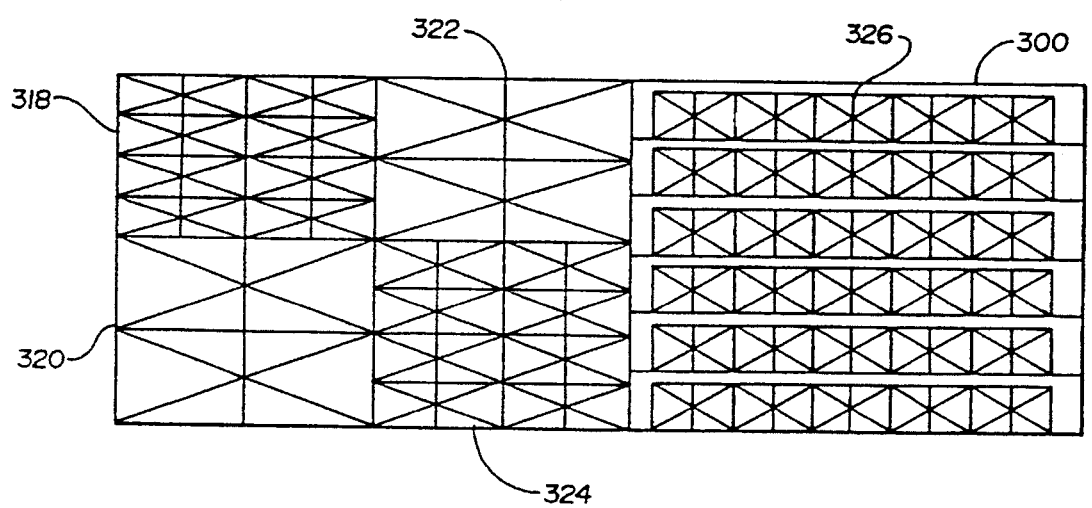
FIG. 42 is a view at a 60° entrance angle of the active apertures of the array shown in FIG. 41.

Referring to FIG. 41, composite array 300 comprises several zones 303, 305, 307, 309, 311 each comprised of cube corner element arrays. Composite arrays may comprise several zones of differently designed arrays including at least one zone comprising, in one embodiment, different geometric structures including cube corner elements formed from two sets of parallel grooves, with the elements having parallel bisectors. In some arrays there are multiple novel features. Zone 311 is an example of a dual groove set array in which: cube corner elements have different heights above a common reference plane; at least two of the grooves in at least one of the groove sets are at a different groove depth; cube corner elements have parallel symmetry axes and spacing between a first groove and an adjacent second groove which differs from the spacing between the second groove and an adjacent third groove; cube corner elements have parallel bisectors and spacing between a first groove and an adjacent second groove which differs from the spacing between the second groove and an adjacent third groove; spacing of grooves within at least one of the groove sets is varied so that at least two of the cube corner elements have different lengths; and, the active aperture sizes vary at non-zero entrance angles. FIG. 42 discloses the active apertures for array 300, in which apertures 318, 320, 322, and 324 correspond to the cube corner elements of zones 303, 305, 307, and 309. Active apertures 326, 327, and 328 correspond to the various apertures for the cube corner elements of zone 311.

Adjacent zones of cube corner element composite arrays may have different sizes and cube corner element orientations. The size of the zones should be selected according to the requirements of particular applications. For example, traffic control applications may require zones which are sufficiently small that they are not visually resolvable by the unaided human eye at the minimum expected viewing distance. This provides a composite array with a uniform appearance. Alternatively, channel/approach marking or directional reflector applications such as pavement markers or barriers may require zones which are sufficiently large that they can be easily resolved by the unaided human eye at maximum required viewing distance. In addition, composite array sheeting may be useful in these applications when maximum total light return is desired at high entrance angles. Conventional array sheeting is not capable of achieving the multi-directional levels of total light return, for example, in a traffic barrier side use, as many of the composite array sheetings of this invention.

Figure 43:
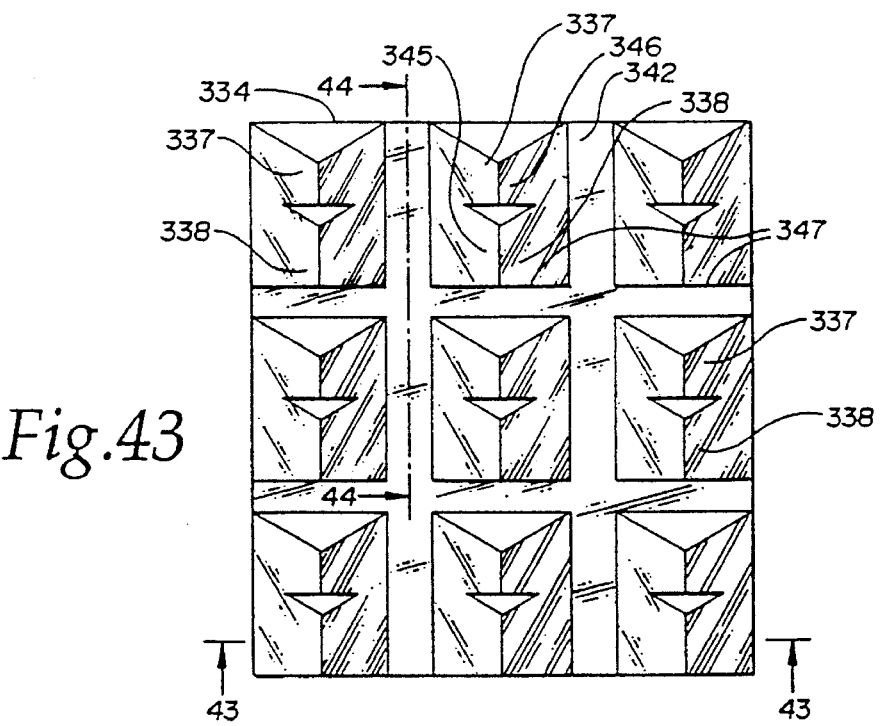
FIG. 43 is a plan view of a portion of a directly machined dual groove set array having variable depths of grooves and separation surfaces.
Figure 44:
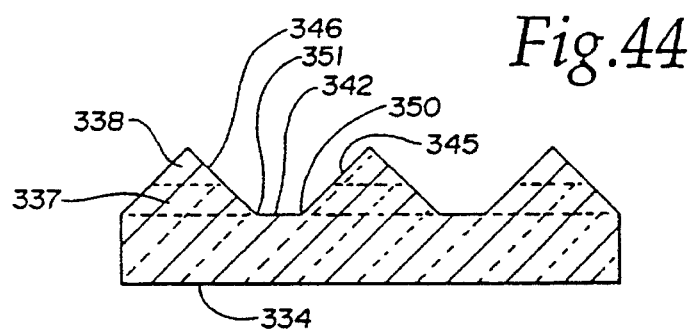
FIG. 44 is a section view of the array taken along line 44—44 in FIG. 43.
Figure 45:
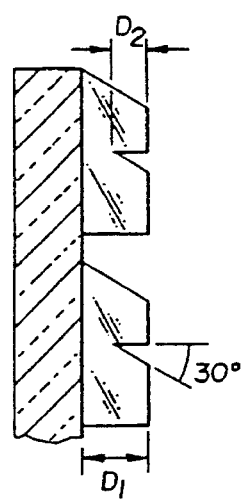
FIG. 45 is a section view of the array taken along line 45—45 in FIG. 43.

FIGS. 43–45 disclose views of array 334 having a plurality of geometric structures including cube corner elements 337, 338 spaced apart by a plurality of separation surfaces 342. The lateral faces 345, 346, 347, 348 of elements 337, 338 form the boundary edges 350, 351 for each separation surface. The lateral faces may include cube corner element optical surfaces as well as non-optical surfaces on cube corner or other geometric structures. A separation surface 342 may have flat or curved portions when viewed in cross section.

Separation surfaces may be advantageously utilized to increase light transmission or transparency in sheeting, including flexible sheeting, utilizing multiple structure retroreflective cube corner element arrays. For example, this is particularly useful in internally illuminated retroreflective articles such as signs or automotive signal light reflectors, which are normally manufactured using injection molding. In the embodiment shown in FIG. 43, separation surfaces are shown in combination with cube edges which have been further cut with variable depth grooves to form additional cube corner elements. This process may also be used to truncate cube edges or other structural surfaces as required. A separation surface 342 may be formed using a machining tool with a flat or curved tip, or by further removal of material from a replica of the multiple structure cube corner element array master. It is recognized that many different combinations of structural features are possible within the scope of this invention, and that these combinations are not limited to specific representative embodiments shown in the Figures.

Suitable materials for retroreflective articles or sheeting of this invention are preferably transparent materials which are dimensionally stable, durable, weatherable, and easily replicated into the desired configuration. Examples of suitable materials include glass; acrylics, which have an index of refraction of about 1.5, such as Plexiglas brand resin manufactured by Rohm and Haas Company; polycarbonates, which have an index of refraction of about 1.59; reactive materials such as taught in U.S. Pat. Nos. 4,576,850, 4,582, 885, and 4,668,558; polyethylene based ionomers, such as those marketed under the brand name of SURLYN by E. I. Dupont de Nemours and Co., Inc.; polyesters, polyurethanes; and cellulose acetate butyrates. Polycarbonates are particularly suitable because of their toughness and relatively higher refractive index, which generally contributes to improved retroreflective performance over a wider range of entrance angles. These materials may also include dyes, colorants, pigments, UV stabilizers, or other additives. Transparency of the materials ensures that the separation or truncated surfaces will transmit light through those portions of the article or sheeting.

The incorporation of truncated and/or separation surfaces does not eliminate the retroreflectivity of the article, but rather it renders the entire article partially transparent. In some applications requiring partially transparent materials, low indices of refraction of the article will improve the range of light transmitted through the article. In these applications, the increased transmission range of acrylics (refractive index of about 1.5) is desirable.

In fully retroreflective articles, materials having high indices of refraction are preferred. In these applications, materials such as polycarbonates, with refractive indices of about 1.59, are used to increase the difference between the indices of the material and air, thus increasing retroreflection. Polycarbonates are also generally preferred for their temperature stability and impact resistance.

We claim:

1. A retroreflective cube corner article which is a replica of a directly machined substrate in which a plurality of geometric structures including cube corner elements are machined in the substrate using only two sets of parallel grooves with each set comprising a plurality of grooves comprising optical surfaces arranged at side angles relative to a groove axis and to a base reference plane, and at least two of the grooves in at least one of the groove sets are at a different groove depth.

2. A retroreflective cube corner article which is a replica of a directly machined substrate in which a plurality of geometric structures including cube corner elements are machined in the substrate using only two sets of parallel grooves with each set comprising a plurality of grooves comprising optical surfaces arranged at side angles relative to a groove axis and to a base reference plane, and at least two of the cube corner elements have different heights above a common reference plane.

3. A retroreflective cube corner article which is a replica of a directly machined substrate in which a plurality of geometric structures including cube corner elements are machined in the substrate using only two sets of parallel grooves with each set comprising a plurality of grooves comprising optical surfaces arranged at side angles relative to a groove axis and to a base reference plane, and at least two of the cube corner elements are machined so that the size of the active apertures differ in both an x direction and a y direction at a non-zero entrance angle.

4. A retroreflective cube corner article which is a replica of a directly machined substrate in which a plurality of different geometric structures including cube corner elements having parallel bisectors are machined in the substrate using only two sets of parallel grooves with each set comprising a plurality of grooves comprising optical surfaces arranged at side angles relative to a groove axis and to a base reference plane.

5. The article of claim 4 in which at least two of the cube corner elements have symmetry axes which are non-parallel.

6. The article of claim 1, 2, 3 or 4 in which the spacing of grooves within at least one of the groove sets having at least three grooves is varied so that the spacing between a first groove and an adjacent second groove differs from the spacing between the second groove and an adjacent third groove.

7. A retroreflective cube corner article which is a replica of a directly machined substrate in which a plurality of geometric structures including cube corner elements having parallel symmetry axes are machined in the substrate using only two sets of parallel grooves comprising optical surfaces arranged at side angles relative to a groove axis and to a base reference plane, and the spacing between a first groove and an adjacent second groove in a groove set differs from the spacing between the second groove and an adjacent third groove in the groove set.

8. The article of claim 1, 2, 3, 4 or 7 in which at least two of the cube corner elements have different lengths.

9. A retroreflective cube corner article which is a replica of a directly machined substrate in which a plurality of geometric structures including cube corner elements are machined in the substrate using only two sets of parallel grooves comprising optical surfaces arranged at side angles relative to a groove axis and to a base reference plane, and the spacing in at least one of the groove sets is varied so that at least two of the cube corner elements have different lengths.

10. The article of claim 1, 2, 4, 7 or 9 which exhibits at least two different active aperture sizes at a non-zero entrance angle.

11. A retroreflective cube corner article which is a replica of a directly machined substrate in which a plurality of geometric structures including cube corner elements are machined in the substrate using only two sets of parallel grooves comprising optical surfaces arranged at side angles relative to a groove axis and to a base reference plane, and at least two of the elements have opposing orientations of element non-retroreflective triangular faces.

12. The article of claim 11 in which the opposing non-retroreflective triangular faces share a common edge.

13. The article of claim 11 in which the elements having an opposing relationship are geometrically identical.

14. The article of claim 1, 2, 4, 7 or 11 in which at least two of the cube corner elements have different heights above a common reference plane.

15. The article of claim 1, 2, 3, 4, 7, 9 or 11 in which a plurality of cube corner elements are at different heights, and a plurality of higher cube corner elements provide support for a sealing medium spaced above lower cube corner elements.

16. The article of claim 1, 2, 3, 4, 7, 9 or 11 in which at least one of the grooves in at least one of the groove sets defines geometric structures including cube corner elements having lateral faces which form boundary edges of a separation surface.

17. The article of claim 16 in which the article is partially light transmissive.

18. The article of claim 16 in which each of the separation surfaces, taken at any point along any surface in which it lays, has a curved cross section.

19. The article of claim 16 in which each of the separation surfaces, taken at any point along any surface in which it lays, has a flat cross section.

20. The article of claim 1, 2, 3, 4, 7, 9 or 11 comprising a structure selected from the group of structures including traffic control materials, retroreflective vehicle markings, directional reflectors, internally illuminated retroreflective articles, and retroreflective markings.

21. The article of claim 1, 2, 3, 4, 7, 9 or 11 comprising at least one groove side angle in at least one set of grooves which differs from the angle that would produce an orthogonal intersection with other faces of elements defined by the groove sides.

22. The article of claim 1, 2, 3, 4, 7, 9 or 11 in which at least one of the sets of grooves includes, in a repeating pattern, at least two groove side angles that differ from one another.

23. The article of claim 1, 2, 3, 4, 7, 9 or 11 in which at least one cube face is arcuate over a significant portion of the cube face to modify the shape of the retroreflected light pattern.

24. The article of claim 23 in which the shape of the arcuate face is concave.

25. The article of claim 23 in which the shape of the arcuate face is convex.

26. The article of claim 23 in which the shape of the arcuate face is substantially cylindrical, so that the axis of the cylinder is approximately parallel to the groove which bounds the arcuate face.

27. The article of claim 1, 2, 3, 4, 7, 9 or 11 in which the article is transparent.

28. The article of claim 1, 2, 3, 4, 7, 9 or 11 in which a portion of the article is reflectively coated.

29. The article of claim 1, 2, 3, 4, 7, 9 or 11 in which at least two cube corner elements share a common optical surface.

30. The article of claim 1, 2, 3, 4, 7, 9 or 11 in which at least one of the cube corner elements comprises a bisector which intersects a base reference plane at an angle other than 90°.

31. A retroreflective cube corner element composite sheeting comprising a plurality of zones of retroreflective cube corner elements, each zone comprising a replica of a directly machined substrate in which a plurality of cube corner elements are machined, the composite sheeting comprising at least one zone in which at least two geometric structures including cube corner elements are formed from two sets of parallel grooves, the geometric structures having different heights above a common reference plane.

32. A retroreflective cube corner element composite sheeting comprising a plurality of zones of retroreflective cube corner elements, each zone comprising a replica of a directly machined substrate in which a plurality of cube corner elements are machined, and the composite sheeting comprising at least one zone in which the grooves are formed from two sets of parallel grooves and at least two of the grooves in at least one of the groove sets are at a different groove depth.

33. A retroreflective cube corner element composite sheeting comprising a plurality of zones of retroreflective cube corner elements, each zone comprising a replica of a directly machined substrate in which a plurality of cube corner elements are machined, and the composite sheeting comprising at least one zone in which at least two geometric structures including cube corner elements are machined using two sets of grooves so that the size of the active apertures differ at a non-zero entrance angle.

34. The sheeting of claim 32 or 33 in which at least one zone comprises at least two cube corner elements which have different heights above a common reference plane.

35. The sheeting of claim 31, 32 or 33 which exhibits asymmetric entrance angularity.

36. The sheeting of claim 31, 32 or 33 which exhibits symmetric entrance angularity.

37. The sheeting of claim 33 in which the size of the active apertures differ in both an x direction and a y direction.

38. A retroreflective cube corner element composite sheeting comprising a plurality of zones of retroreflective cube corner elements, each zone comprising a replica of a directly machined substrate in which a plurality of cube corner elements are machined, and the composite sheeting comprising at least one zone in which a plurality of geometric structures including cube corner elements are formed using two groove sets.

39. The sheeting of claim 38 in which all of the cube corner elements in at least one of the zones formed using two groove sets have parallel bisector axes.

40. The sheeting of claim 38 in which at least two of the cube corner elements in at least one of the zones formed using two groove sets have opposing orientations of element non-retroreflective triangular faces.

41. A retroreflective cube corner element composite sheeting comprising a plurality of zones of retroreflective cube corner elements, each zone comprising a replica of a directly machined substrate in which a plurality of cube corner elements are machined, and the composite sheeting comprising at least one zone formed using two sets of parallel grooves in which the spacing of grooves within at least one of the groove sets varies so that at least two of the cube corner elements have different lengths.

42. The sheeting of claim 32, 33, 34, 38 or 41 in which the spacing of grooves within at least one of the groove sets is varied so that the spacing between a first groove and an adjacent second groove differs from the spacing between the second groove and an adjacent third groove.

* * * * *

UNITED STATES PATENT AND TRADEMARK OFFICE
CERTIFICATE OF CORRECTION

PATENT NO.: 5,585,164
DATED: December 17, 1996
INVENTOR(S): Kenneth L. Smith and Gerald M. Benson It is certified that error appears in the above-identified patent and that said Letters Patent is hereby corrected as shown below:

Col. 18/Line 8   Delete "32, 33, 34" and insert in place thereof - -31, 32, 33- -.

Signed and Sealed this

Twenty-sixth Day of May, 1998

Attest:

BRUCE LEHMAN

*Attesting Officer*    *Commissioner of Patents and Trademarks*